United States Patent [19]

Watanabe et al.

[11] 4,273,420
[45] Jun. 16, 1981

[54] LIQUID CRYSTAL DISPLAY DEVICE

[75] Inventors: Takeshi Watanabe, Yokohama; Ryoichi Sudo, Yokosuka; Fusaji Shoji, Yokohama; Issei Takemoto, Yokohama; Hitoshi Yokono, Yokohama, all of Japan

[73] Assignee: Hitachi, Ltd., Tokyo, Japan

[21] Appl. No.: 56,119

[22] Filed: Jul. 9, 1979

[30] Foreign Application Priority Data

| Jul. 7, 1978 | [JP] | Japan | 53/81891 |
| Oct. 6, 1978 | [JP] | Japan | 53/122595 |
| Nov. 6, 1978 | [JP] | Japan | 53/135855 |
| Nov. 6, 1978 | [JP] | Japan | 53/135857 |

[51] Int. Cl.$^3$ .................................. G02F 1/133
[52] U.S. Cl. ...................... 350/341; 528/30; 528/43; 428/429; 428/447
[58] Field of Search .............. 350/341; 528/30, 43; 428/1, 429, 447

[56] References Cited

U.S. PATENT DOCUMENTS

| 3,991,241 | 11/1976 | Matsumoto et al. | 350/341 X |
| 4,038,441 | 7/1977 | Dubois | 350/341 X |

Primary Examiner—Edward S. Bauer
Attorney, Agent, or Firm—Craig & Antonelli

[57] ABSTRACT

A liquid crystal display device using an alignment film of ladder-type organosilicone polymer or cross-linking product of cross-linkable ladder-type organosilicone polymer makes a homogeneous liquid crystal orientation, irrespectively of the kind of the liquid crystal used, never lowers its orientation ability even when fusion-sealing or sealing of the liquid crystal device is made with glass or thermosetting resin, and makes a clear display owing to the alignment film being colorless. The alignment film is insoluble in the liquid crystal used.

5 Claims, 3 Drawing Figures

LIQUID CRYSTAL DISPLAY DEVICE

BACKGROUND OF THE INVENTION

This invention relates to a liquid crystal display device containing a nematic or cholesteric liquid crystal horizontally oriented in advance, where the orientation of a liquid crystal molecule is changed by applying an electric field, a magnetic field, heat or the like to the device and changing the intensities of the electric field, magnetic field, heat or the like, and more particularly to an alignment film of such a liquid crystal display device.

A liquid crystal display device is basically in such a structure that a pair of glass substrates are arranged in parallel at a specific distance, and a transparent, electroconductive film is selectively deposited on each of counter-faced sides of the pair of substrates, where these electroconductive films and glass surfaces are completely coated by an alignment film, which aligns liquid crystal in a chosen direction on surface; liquid crystal is filled between the alignment films; a sealing is tightly made around the entire edge clearance between the substrates so that the liquid crystal may not be leaked therethrough; and a polarization plate is arranged often on the surface of the substrate where no alignment film is formed.

The liquid crystal display device of such a basic structure is based on any of the following five display systems:

(a) Twisted nematic field effect type display system,
(b) Induced birefringence field effect type display system,
(c) Dynamic scattering type display system,
(d) Guest-host dichromatic display system, and
(e) Orientation-vibration type display system, and the system (a) is widely utilized.

The following four alignment films are employed for the liquid crystal display device:

(a) Obliquely vapor-deposited film of silicon oxide, etc.,
(b) A surface-treating agent film, or a thermosetting, polymeric film of straight chain polymer, epoxy resin or the like, the film being subjected to rubbing treatment (U.S. Pat. Nos. 3,991,241 and 3,961,843, and Japanese Laid-open Patent Application No. 96043/77),
(c) A highly heat-resistance polyimide film subjected to rubbing treatment (U.S. Pat. No. 3,994,567), and
(d) Glass substrate itself, subjected to rubbing treatment.

However, all of these alignment films have the following disadvantages:

(a) The obliquely vapor-deposited film of silicon oxide, etc. is different in orientation ability, depending upon type of the liquid crystal used, and no orientation is made at all in some liquid crystal. Thus, various types of liquid crystals cannot be used by mixing so as to improve a temperature characteristic and an electro-optical characteristic of liquid crystals, especially, a visual field angle characteristic is a little poor.
(b) In the case of a surface-treating agent film, or a thermo-setting polymeric film of straight chain polymer, epoxy resin, or the like, an orientation ability is lowered, when a fusion sealing or sealing operation is carried out by heating an organic or inorganic fusion sealing agent or sealing compound.
(c) Since the polyimide film is yellowish brown, a display ground is not clear, and such is not preferable especially for the guest-host type dichromatic display system, because a color display is required therein. Furthermore, a domain due to an orientation discontinuation is liable to be induced at display segment edge by electric field after the treatment at a high temperature, for example, 450° C.
(d) In the glass substrate itself, subjected to the rubbing, an orientation ability is lowered by the heating at the fusion sealing or sealing operation.

BRIEF SUMMARY OF THE INVENTION

An object of the present invention is to overcome the disadvantages of said prior art, and provide an alignment film, (a) which is applicable to various types of liquid crystals, (b) which maintains the orientation ability itself after the heating at fusion sealing or sealing operation and is never affected by the fusion sealing agent or sealing compound, (c) which is insoluble in the liquid crystal, and (d) which is colorless.

Said object is attained by using a ladder type, organosilicone polymer represented by the following general formula (1):

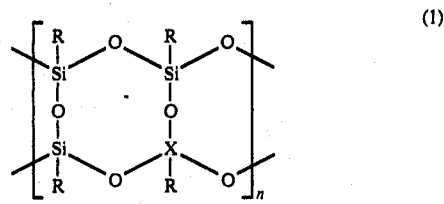

wherein n is 25–5,000, where a heat resistance becomes poor when n is less than 25, and a solubility in a solvent becomes poor when n is more than 5,000; X is Si, or any one metal of Al, Ti, B, Ge, Sn, P, As, Mg, Pb, Zr, Sb, Cr, Fe, Co, and Ni; R is at least one member selected from phenyl group, alkyl-substituted phenyl group, halogen-substituted phenyl group, diphenyl group, alkyl-substituted diphenyl group, halogen-substituted diphenyl group, naphthyl group, alkyl-substituted naphthyl group, halogen-substituted naphthyl group and alkyl group such as methyl group, ethyl group, propyl group, butyl group, amyl group, hexyl group, etc., or cross-linkable, ladder type organosilicone polymer wherein not more than 30% by mole of R in repetition units of the ladder type, organosilicone polymer of the general formula (1), preferably 0.5–20% by mole (particularly owing to being insoluble in the liquid crystal) thereof, is one of the following groups susceptible to cross-linking reaction (good homogeneous liquid crystal orientation not taking place when more than 30% of R is contained):

—(CH$_2$)$_n$—OH (n=1–5) hydroxyalkyl group,
—(CH$_2$)$_n$—SH (n=1–5) mercaptoalkyl group,
—(CH$_2$)$_n$—X (n=1–5, X=Cl, I, Br, or F) haloalkyl group,
—(CH$_2$)$_n$—NH$_2$ (n=1–5), aminoalkyl group,

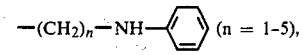

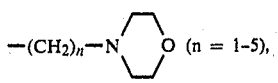 (n = 1–5),

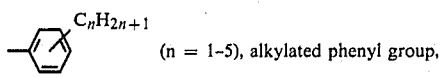 (n = 1–5), alkylated phenyl group,

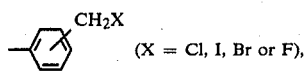 (X = Cl, I, Br or F),

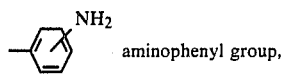 aminophenyl group,

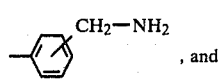, and

—CH=CH$_2$, vinyl group, the balance being the group specifically defined, referring to said R (which is not susceptible to cross-linking reaction), thereby forming a film.

DETAILED DESCRIPTION OF THE PREFERRED EMBODIMENT

Figure 1:
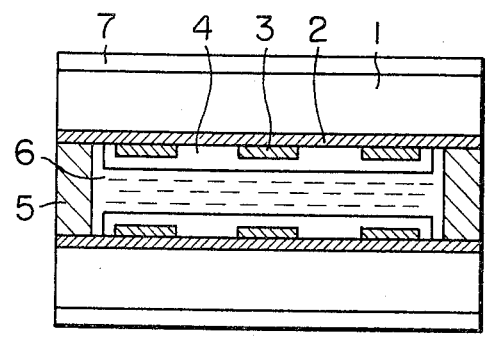
FIGS. 1–3 are cross-sectional view of the liquid crystal display devices according to the present invention.

Description will be made of materials to be used in the present invention.

Ladder-type organosilicone polymer includes, specifically, poly(phenylsilsesquioxane), poly(methylphenylsilsesquioxane), poly(dimethylphenylsilsesquioxane), poly(chlorophenysilsesquioxane), poly(bromophenylsilsesquioxane), poly(butylsilsesquioxane), poly(phenylisobutylsilsesquioxane), poly(phenylisoamylsilsesquioxane), poly(phenyl-n-hexylsilsequioxane), poly(isobutylenesilsesquioxane), poly(naphthylsilsesquioxane), poly(diphenylsilsesquioxane), poly(aluminoorganosiloxane), poly(titanoorganosiloxane), poly(boronoorganosiloxane), etc. However, poly(phenylsilsesquioxane) is preferable.

In order to provide an organosilicone polymer film on a substrate, the organosilicone polymer is dissolved in a solvent, applied to the substrate, and heated. For example, the organosilicone polymer is dissolved in a solvent such as benzene, toluene, cyclohexanone, monochlorobenzene, monobromobenzene, o-dichlorobenzene, m-dichlorobenzene, trichloroethylene, 1,1,1-trichloroethane, 1,1,1,2-tetrachloroethane, cyclohexanone, N-methyl-2-pyrolidone, N,N'-dimethyl acetamide, N,N'-dimethyl formamide, veratrole, tetralin, o-methoxytoluene, anisole, etc. to prepare a 0.05–50% solution. The solution can be applied to the substrate by brushing, immersion, spin coating, spraying, printing, etc.

After the application, the coating is dried by heating to 100° C.–350° C., preferably 150° C.–300° C. to provide a film on the substrate.

Thickness of organosilicone polymer film is preferably 0.01–10 μm, more preferably 0.02–0.5 μm.

The cross-linkable, ladder-type organosilicone polymer is said ladder-type organosilicone polymers, not more than 30% of R whose substituents are comprised of the following cross-linkable groups:

—(CH$_2$)$_n$—OH (n=1–5) hydroxylalkyl group,
—(CH$_2$)$_n$—SH (n=1–5) mercaptoalkyl group,
—(CH$_2$)$_n$—X (n=1–5, X=Cl, K, Br, or F) haloalkyl group,
—(CH$_2$)$_n$—NH$_2$ (n=1–5) aminoalkyl group,

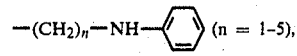 (n = 1–5),

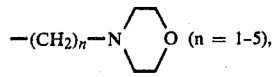 (n = 1–5),

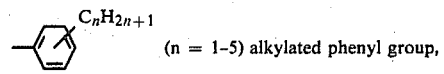 (n = 1–5) alkylated phenyl group,

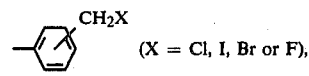 (X = Cl, I, Br or F),

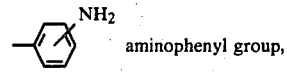 aminophenyl group,

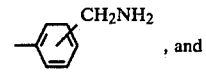, and

—CH=CH$_2$ vinyl group.

Liquid crystal applicable in combination with the alignment film of the present invention are such nematic liquid crystals as:

Schiff base type liquid crystals having, for example, the following general formulae:

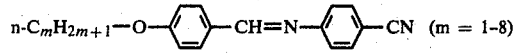 (m = 1–8)

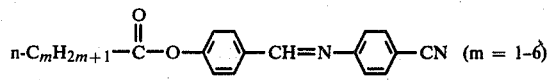 (m = 1–6)

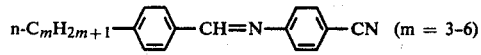 (m = 3–6)

 (m = 1–6)

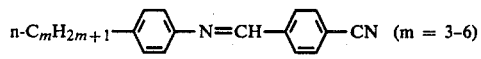 (m = 3–6)

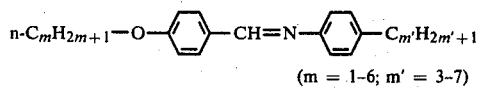

(m = 1–6; m' = 3–7)

Azoxy type liquid crystals having, for example, the following general formulae:

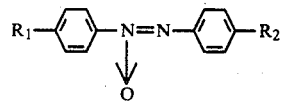

(R$_1$, R$_2$: n-C$_m$H$_{2m+1}$, m = 4–7)

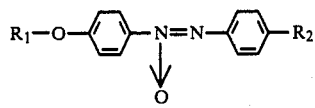

($R_1$, $R_2$: n-$C_mH_{2m+1}$, m = 1-7)

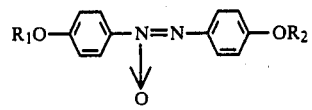

($R_1$, $R_2$: n-$C_mH_{2m+1}$, m = 1-6)

Biphenyl type liquid crystals having, for example, the following general formulae:

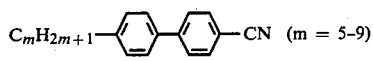

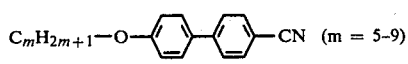

Ester type liquid crystals having, for example, the following general formulae:

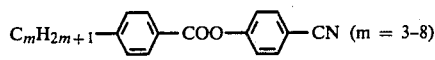

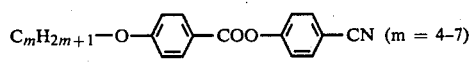

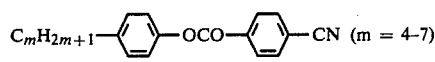

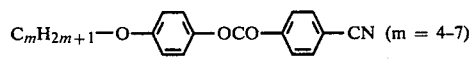

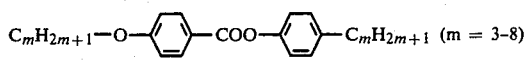

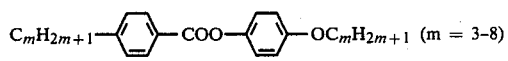

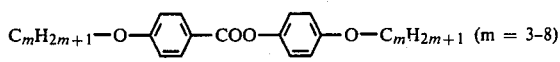

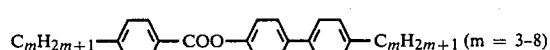

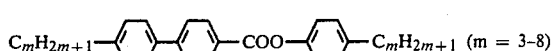

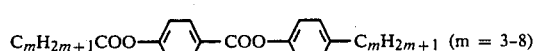

Azo type liquid crystal having, for example, the following general formula:

Terphenyl type liquid crystal having, for example, the following general formula:

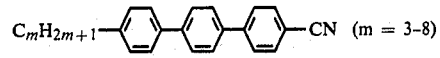

Phenylcyclohexane type liquid crystals having, for example, the following general formulae:

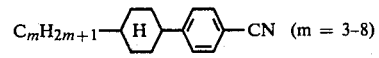

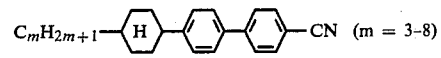

Phenylpyridine type liquid crystals having, for example, the following general formulae:

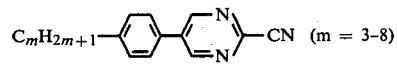

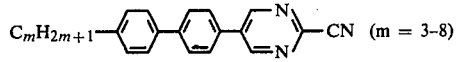

and the like.

Cholestesteric type liquid crystals wherein a cholesterol derivatives (0.05-5% by weight), an optically active material such as a biphenyl derivative having an optically active substituent, etc. are added to said nematic liquid crystal, a mixture of said nematic liquid crystals, a mixture of said cholestrol liquid crystals, etc.

The fusion sealing agent and sealing compound applicable in combination of the alignment film of the present invention can be either an organic or inorganic material. The organic material includes epoxy resin, etc., and the inorganic material includes non-crystalline or crystalline, low melting point glass frit, preferably a low melting point glass frit that can be sealed by heating at a temperature below 500° C., particularly in a low temperature range of 350°-470° C. When crystalline glass frit is used, it is preferable that the frit has a coefficient of heat expansion almost equal to that of the part to be applied. Glass frit is usually dispersed in an organic binder, and provided at a sealing part on an electrode film or a protective layer for electrode film by screen printing process, etc. The organic binder is prepared by dissolving ethyl cellulose, nitrocellulose or the like in a solvent such as butylcarbitol, etc. 0.1-10 parts by weight of the organic binder is mixed with 10 parts by weight of frit, and used.

Substrate used in combination of the present alignment film is made of glass.

Transparent electrode is comprised of tin oxide and indium oxide as main components, and can be formed on the glass substrate by vacuum deposition.

The present invention will be described in detail, referring to Examples.

EXAMPLE 1

A film 2 of SiO$_2$ having film thickness of 300 A was formed by vapor-depositing SiO$_2$ on a glass substrate 1 and heating it at 400° C. for one hour, and a film of In$_2$O$_3$+SnO$_2$ (20:1) having a film thickness of 500 A was then formed thereon by spattering, and photo-etched to selectively form a transparent electroconductive film 3, as shown in FIG. 1. Then, poly(phenylsilsesquioxane) (n=100) was dissolved in benzene as a solvent to prepare a 3% poly(phenylsilsesquioxane) solution in benzene. The resulting solution was coated onto the substrate by spin coat method so that said film 3 can be completely coated. Then, the coating was heated at 200°-300° C. for 0.5 to 2 hours, and then subjected to a rubbing treatment, whereby an alignment film 4 was formed. Then, the alignment film surfaces were made to counter-face to each other in parallel, and a fusion sealing 5 was made except a liquid crystal inlet (not shown in the drawing) by placing lead borosilicate glass frit around the open peripheral edge clearance between the substrates and heating the frit at 450° C. for one hour. Then, a liquid crystal 6 was introduced under vacuum into between the substrates from the liquid crystal inlet (not shown in the drawing). The following 5 kinds of liquid crystals were introduced under vacuum:

a mixture of Azoxy type liquid crystals

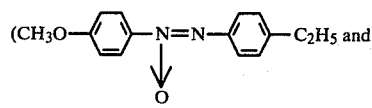

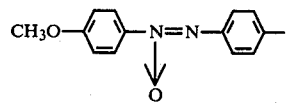

C$_4$H$_9$ being mixed together at a ratio of 1:1 by weight),
a mixture of Ester type liquid crystals

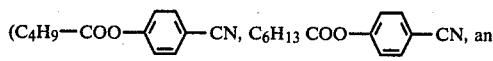

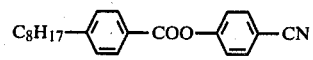

being mixed together at a ratio of 1:1:1 by weight),
a mixture of Biphenyl type liquid crystals

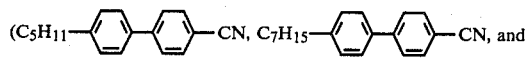

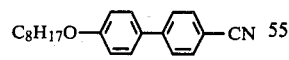

being mixed together at a ratio of 1:1:1 by weight),
a mixture of Cyclohexane-phenyl type liquid crystals

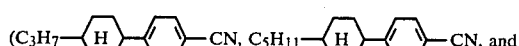

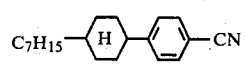

being mixed together at a ratio of 1:1:1 by weight), and a mixture of Schiff base type liquid crystals

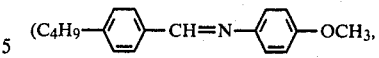

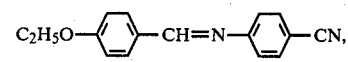

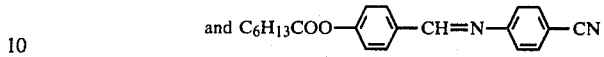

being mixed together at a ratio of 1:1:1 by weight).

Sealing of the liquid crystal inlet was soldered after vapor deposition of Ni alloy. Furthermore, a polarizing plate 7 was made to adhere to another side of the substrate in accordance with the rubbing direction of the alignment film.

5 kinds of twisted nematic type liquid crystal display devices were prepared in this manner and all had a homogeneous orientation without any defect in orientation. Thus, good display characteristics were obtained. The alignment films were insoluble in the liquid crystals and also were colorless, giving a clear display.

Figure 2:
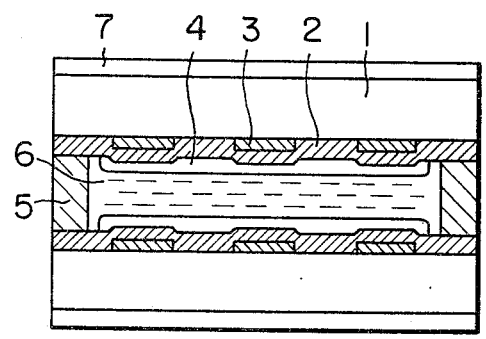

Liquid crystal display devices provided with a SiO$_2$ film 2 in said 5 kinds of liquid crystals display devices, as shown in FIG. 2 had characteristics similar to those described above.

EXAMPLE 2

Figure 3:
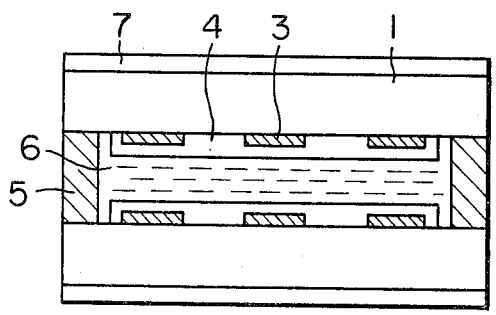

Liquid crystal display devices as shown in FIGS. 1 and 2 and also liquid crystal display devices as shown in FIG. 3 were prepared in the same manner as in Example 1, except that cyclohexanone was used as the solvent, and the sealing of the open peripheral edge clearance and the liquid crystal inlet were carried out by using epoxy resin and heating and hardening the resin at 200° C. for one hour, all these devices had results similar to those of Example 1.

EXAMPLE 3

Liquid crystal display devices were prepared in the same manner as in Examples 1 and 2, except that the alignment film was formed by coating a 3% poly(phenylisoamylsilsesquioxane) (n=500) solution in toluene by spin coat method and heating the coating at 150°-250° C. for one hour. The devices had results similar to those of Examples 1 and 2.

EXAMPLE 4

Liquid crystal display devices were prepared in the same manner as in Examples 1 and 2, except that the alignment film was formed by coating a 3% poly(m-chlorophenylsilsesquioxane) (n=2000) in benzene by spin coat method, and heating the coating at 200°-300° C. for 0.5 hours. The devices had results similar to those of Examples 1 and 2.

EXAMPLE 5

Liquid crystal display devices were prepared in the same manner as in Examples 1 and 2, except that the alignment film was formed by coating a 3% poly(phenylisobutylsilsesquioxane) solution (n=100), where the ratio of C$_6$H$_5$ to iso-C$_4$H$_9$ present in repetition units was 3:1 in cyclohexane by spin coat method and heating the coating at 200°-300° C. for 0.5-2 hours. The devices had results similar to those of Examples 1 and 2.

EXAMPLE 6

Liquid crystal display devices were prepared in the same manner as in Examples 1 and 2, except that three kinds of the alignment films were formed by coating a 3% poly(aluminophenylsiloxane) (n=50) in benzene, and a 3% poly(titanophenylsiloxane) (n=50) in benzene, and a 3% poly(boronophenylsiloxane) (n=50) in benzene, each, by spin coat method and heating these coatings at 150°-200° C. for one hour. The devices had results similar to those of Examples 1 and 2.

EXAMPLE 7

Liquid crystal display devices were prepared in the same manner as in Examples 1 and 2, except that 9 kinds of the alignment films were formed by coating 3% poly(phenylsilsesquioxane) (n=100) solutions in cyclohexanone, where γ-phenylamino-propyl groups are present at 0.5% by mole, 2% by mole and 30% by mole, separately in the repetition units, 3% poly(phenylsilsesquioxane) (n=110) solutions in cyclohexanone, where γ-aminopropyl groups are present at 0.5% by mole, 5% by mole, and 30% by mole, separately in the repetition units, and 3% poly(phenysilsesquioxane) (n=110) solutions in cyclohexanone, where tolyl groups are present at 0.5% by mole, 6% by mole, and 30% by mole, separately, in the repetition groups, by spin coat method and heating these coatings separately at 250°-400° C. for 0.5-4 hours, and the five kinds of the liquid crystal mixtures of Example 1 were used for these 9 kinds of the alignment films. The devices had results similar to those of Examples 1 and 2.

COMPARATIVE EXAMPLE 1

Liquid crystal display devices were prepared in the same manner as in Examples 1 and 2, except that the alignment films were formed by coating a 3% linear polymer type poly(phenylmethylsiloxane) solution in toluene, where a ratio of $C_6H_5$ to $CH_3$ present in the repetition units was 7.3:1 by spin coat method, and heating the coating at 200°-300° C. for 0.5-2 hours. As a result, orientation was poor in the case of the liquid crystal being the mixture of Azoxy type liquid crystals, and vertical orientation took place in the cases of the mixture of Ester type liquid crystals, the mixture of Biphenyl type liquid crystals, and the mixture of Schiff base type liquid crystals, and the devices were practically impossible to use.

In the case of the liquid crystals of cyclohexane-phenyl system, the alignment films were deteriorated by heating at the fusion sealing or sealing by lead borosilicate glass or epoxy resin, and were practically impossible to use.

COMPARATIVE EXAMPLE 2

Liquid crystal display devices were prepared in the same manner as in Examples 1 and 2, except that the alignment films were formed by coating a 3% phenyltriethoxysilane solution in ethanol by spin coat method, and heating the coating at 200° C. for one hour. As a result, the alignment films of all the devices lost the rubbing effect when the fusion sealing or sealing of the liquid crystal display devices was carried out by heating the lead borosilicate glass frit at 450° C. for one hour, or heating the epoxy resin at 200° C. for one hour, and were also fouled by the fusion sealing agent or sealing compound. The devices were practically impossible to use.

COMPARATIVE EXAMPLE 3

Liquid crystal display devices were prepared in the same manner as in Examples 1 and 2, except that the alignment films were formed by coating a 3% polyimide (made of Du Pont, U.S.A.) solution in N-methylpyrolidone by spin coat method and heating the coating at 250° C. for one hour. As a result, clear display could not be obtained owing to the coating being yellowish brown.

When the fusion sealing and sealing of the liquid crystal display devices were carried out with lead borosilicate glass frit by heating at 450° C. for one hour, a defect in orientation appeared at the edge part of the electrode when electric field is applied.

As described above, in the present liquid crystal display device, (a) a homogeneous orientation can be obtained, irrespective of the kind of liquid crystals used, (b) even if a fusion sealing for a liquid crysatl display device is carried out with glass or thermo-setting resin, the orientation ability is not lowered, (c) the alignment film is insoluble in the liquid crystal, and (d) a clear display can be made owing to the alignment film being colorless. Thus, the present invention can be also applied, with a great advantage, to a color display device such as guest-host type dichromatic display system. The alignment film of the present invention is effectively applied to a twisted nematic field effect-type display system, an induced birefringence field effect-type display system (wherein the alignment film may be sometimes formed on one counter-faced side of one glass substrate among the two substrates arranged in parallel), a dynamic scattering-type display system, a guest-host type dichromatic display system, and an orientation-vibration type display system.

The liquid crystal display device of the present invention is used in display boards, count display boards, etc. of wrist watch, clock, electronic table calculator, etc.

What is claimed is:

1. A liquid crystal display device having a liquid crytal layer between a pair of substrates, each, having an electrode thereon, which comprises an alignment film of ladder-type organosilicone polymer represented by the following general formula of repetition unit being formed on counter-faced sides of said substrates:

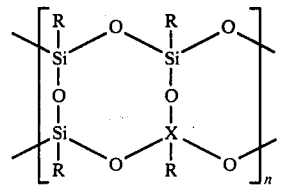

wherein n=25-5,000, X is Si or one of metals of Al, Ti, B, Ge, Sn, P, As, Mg, Pb, Zr, Sb, Cr, Fe, Co, and Ni, and R is at least one member selected from phenyl group, alkyl-substituted phenyl group, halogen-substituted phenyl group, diphenyl group, alkyl-substituted diphenyl group, halogen-substituted diphenyl group, naphthyl group, alkyl-substituted naphthyl group, halogen-substituted naphthyl group, and alkyl groups including methyl group, ethyl group, propyl group, butyl group, amyl group, hexyl group, etc.

2. A liquid crystal display device according to claim 1, wherein the alignment film of the ladder-type organosilicone polymer is one compound selected from poly(phenylsilsesquioxane), poly(phenylisoamylsilsesquioxane), poly(m-chlorophenylsilsesquioxane), poly(phenylisobutylsilsesquioxane), poly(aluminophenylsiloxane), poly(titanophenylsiloxane), and poly(boronophenylsiloxane).

3. A liquid crystal display device having a liquid crystal layer between a pair of substrates, each, having an electrode thereon, which comprises an alignment film of cross-linked product of cross-linkable, ladder-type organosilicone polymer represented by the following general formula of repetition unit being formed on counter-faced sides of the substrates:

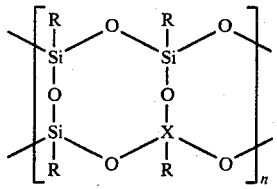

wherein N=25–5,000, X is Si or one of metals of Al, Ti, B, Ge, Sn, P, As, Mg, Pb, Zr, Sb, Cr, Fe, Co, and Ni, and R is such that not more than 30% by mole of R in the repetition unit of said general formula is one group capable of undergoing cross-linking reaction, selected from:
—(CH$_2$)$_n$—OH (n=1–5),
—(CH$_2$)$_n$—SH (n=1–5),
—(CH$_2$)$_n$X (n=1–5; X=Cl, I, Br or F),
—(CH$_2$)$_n$NH$_2$ (n=1–5),

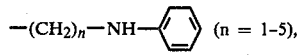

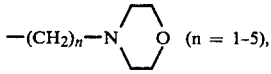

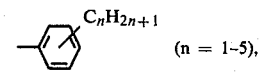

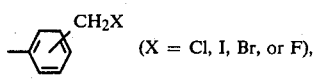

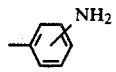

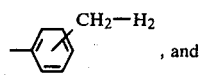

—CH=CH$_2$, and more than 70% of R is at least one group, selected from phenyl group, alkyl-substituted phenyl group, halogen-substituted phenyl group, diphenyl group, alkyl-substituted diphenyl group, halogen-substituted diphenyl group, naphthyl group, alkyl-substituted naphthyl group, halogen-substituted naphthyl group, and alkyl group.

4. A liquid crystal display device having a liquid crystal layer between a pair of substrates, each, having an electrode thereon, which comprises an alignment film of cross-linked product of cross-linkable, ladder-type organosilicone polymer having the following general formula of repetition unit being formed on counter-faced sides of the substrates:

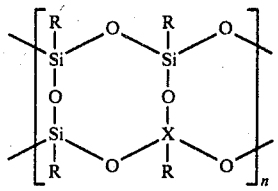

wherein n=25–5,000, X is Si or one of metals of Al, Ti, B, Ge, Sn, P, As, Mg, Pb, Zr, Sb, Cr, Fe, Co, and Ni, and R is such that 0.5–30% by mole of R in the repetition unit of said general formula is one group capable of undergoing cross-linking reaction, selected from:
—(CH$_2$)$_n$—OH (n=1–5),
—(CH$_2$)$_n$—SH (n=1–5),
—(CH$_2$)$_n$X (n=1–5; X=Cl, I, Br or F),
—(CH$_2$)$_n$NH$_2$ (n=1–5),

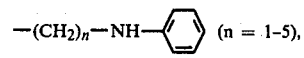

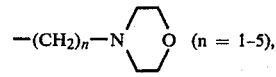

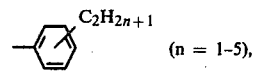

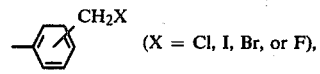

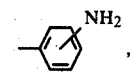

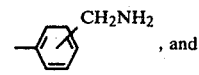

—CH=CH$_2$, and 70–99.5% of R is at least one group, selected from phenyl group, alkyl-substituted phenyl group, halogen-substituted phenyl group, diphenyl group, alkyl-substituted diphenyl group, halogen-substituted diphenyl group, naphthyl group, alkyl-substituted naphthyl group, halogen-substituted napthyl group, and alkyl group.

5. A liquid crystal display device according to claim 4, wherein the alignment film of the cross-linking product of cross-linkable, ladder-type organosilicone polymer is one of cross-linking products of poly(phenylsilsesquioxane) containing 0.5–30% of R by mole of γ-phenylaminopropyl group in the repetition unit, poly(phenylsilsesquioxane) containing 0.5–30% by mole of γ-aminopropyl group in repetition unit, and poly(phenylsilsesquioxane) containing 0.5–30% by mole of tolyl group in repetition unit.

* * * * *